United States Patent
Mathew et al.

(10) Patent No.: US 6,665,606 B2
(45) Date of Patent: Dec. 16, 2003

(54) DISTRIBUTED ENGINE PROCESSING SYSTEM

(75) Inventors: Joseph Cheri Mathew, Columbus, IN (US); George Brunemann, Cincinnati, OH (US); Tom Dollmeyer, Columbus, IN (US)

(73) Assignee: Cummins, Inc., Columbus, IN (US)

(*) Notice: Subject to any disclaimer, the term of this patent is extended or adjusted under 35 U.S.C. 154(b) by 347 days.

(21) Appl. No.: 09/789,038

(22) Filed: Feb. 20, 2001

(65) Prior Publication Data

US 2002/0116116 A1 Aug. 22, 2002

(51) Int. Cl.[7] .............................................. G06F 19/00
(52) U.S. Cl. ...................................... 701/114; 701/115
(58) Field of Search ................................ 701/29, 2, 33, 701/101, 102, 103, 114, 115; 180/167; 123/350, 478, 399

(56) References Cited

U.S. PATENT DOCUMENTS

| | | | |
|---|---|---|---|
| 5,426,585 A | 6/1995 | Stepper et al. | |
| 5,442,553 A | 8/1995 | Parrillo | |
| 5,490,064 A | 2/1996 | Minowa et al. | |
| 5,550,738 A | 8/1996 | Bailey et al. | |
| 5,619,412 A | 4/1997 | Hapka | |
| 5,638,272 A | 6/1997 | Minowa et al. | |
| 5,729,452 A | 3/1998 | Smith et al. | |
| 5,732,074 A | 3/1998 | Spaur et al. | |
| 5,769,051 A | 6/1998 | Bayron et al. | |
| 5,999,876 A | * 12/1999 | Irons et al. | 701/115 |
| 6,009,372 A | 12/1999 | Baker et al. | |
| 6,078,873 A | 6/2000 | Shutty et al. | |
| 6,112,151 A | * 8/2000 | Kruse | 701/115 |
| 6,112,152 A | * 8/2000 | Tuttle | 701/115 |
| 6,151,549 A | * 11/2000 | Andrews et al. | 701/115 |
| 6,169,943 B1 | * 1/2001 | Simon et al. | 701/115 |
| 6,411,887 B1 | * 6/2002 | Martens et al. | 701/115 |

FOREIGN PATENT DOCUMENTS

| | | |
|---|---|---|
| EP | 0 919 419 | 6/1999 |
| WO | WO 96/27513 | 9/1996 |

* cited by examiner

*Primary Examiner*—Willis R. Wolfe
(74) *Attorney, Agent, or Firm*—Barnes & Thornburg

(57) ABSTRACT

The present invention provides a distributed engine processing system, which includes a plurality of engines with an electronic engine control module located within each of the engines. The electronic engine control module is in substantially continuous communication with a server, located remotely from the electronic engine control module. There is included in the invention a means of communication between the electronic engine control module and the server. The invention further provides a method for distributing engine processing. The electronic engine control module downloads engine information to a common server, which performs processing and analysis of the downloaded information from each engine and processing and analysis of the information downloaded by all engines. After the processing, the server stores all the information within a memory of the server. The invention also provides a method for adaptation of the engine in response to the analyses by the server and a method for notification of the engine operator of the changes made to the engine or any necessary services that should be performed on the engine.

13 Claims, 3 Drawing Sheets

DISTRIBUTED ENGINE PROCESSING SYSTEM

BACKGROUND OF THE INVENTION

The present invention relates to a system that allows an engine to split its computer processing work between an on-board electronic engine control module and an off-board computer server. The off-board server is responsible for processing and storage on behalf of the electronic engine control module. The electronic engine control module remains responsible for collecting engine data, forwarding that data to the server, taking corrective action sent by the server, and maintaining those processing needs necessary to continue the operation of the engine (e.g. controlling the firing of the spark plugs and pistons, controlling the injection of fuel by fuel injectors, etc.).

In the internal combustion engine field, it is common practice to include an electronic engine control module (ECM) to provide electronic signals to the engine components, such as fuel injectors, EGR valve, air intake, and others. Through these electronic signals, the ECM continuously regulates the operation of the engine. In the early years of ECM usage, the module utilized specific unchangeable programs for controlling the operation of the engine.

In recent years, the ECMs have become field-programmable. This feature enables product enhancements to be made in existing ECMs at a greatly reduced cost. In a typical application, one generic control module can be programmed for many different applications, e.g., different engine ratings or different engine applications. These changes can be made without any alterations to the physical configuration of the module.

Although ECMs are programmable, current engine control modules are restricted to any memory and any computing power that is included as part of the module. These restrictions are the result of cost limitations wherein any additional computing power and/or additional memory would create a greater cost per item, with that greater cost being passed along to the customers. Cost versus power is a delicate balance, which has typically been tipped toward restricting power to maintain lower costs, thus resulting in the limited power of the ECMs seen today.

ECMs are capable of recording information relating to the engine and can prove to be excellent libraries of engine data and information relating to transactions, occurrences, and changes in the engine. However, the information obtained relates only to the engine in which the ECM is located. Under current methods, obtaining information relating to the entire engine population and maintaining that information in one location has proven to be very labor intensive. In order to obtain the data, a technician must download any data from the ECM to a hand-held unit and then further download that data to a personal computer (PC) or to a workstation. It can be seen that simply obtaining data from the ECM is a relatively long process. In order to maintain the data in one location, the data from all the PCs and workstations must be transmitted to a central server. Therefore, several steps between the ECM and the server are required to create any library of all engine data for an entire fleet of vehicles.

Additionally, obtaining data cannot be done while the vehicle is in operation since a physical connection is currently required to deliver that data from the ECM to the handheld unit and on down the chain. For safety reasons, such physical connections are virtually impossible without stopping and parking the vehicle. Beyond the labor-intensive nature of obtaining data, such data collection tasks are also an undue burden on the operators since each operator must stop and park his vehicle in order for the data to be downloaded.

A similar problem is that any changes to the engine, which may be necessary for improved engine performance, can only be accomplished when the vehicle is stopped, usually in a service area. For example, in interstate trucking applications, the performance requirements for engines traveling in a relatively flat state, such as Kansas, are vastly different from the necessary engine conditions for a more mountainous state, such as Colorado. In order for the engine characteristics to be changed to compensate for these new conditions, the operator must stop and make the adjustments manually through the use of handheld service tools. If the operator is unable to make the changes, then the operator must have someone else make those necessary adjustments, again using handheld service tools. The necessity for stopping to make the changes creates delays in the transit of goods and creates undue delays at the service areas for the operators of the vehicles. A system in which the changes may be made without stopping, or may be made via remote means, is greatly desired for such applications.

These are problems experienced by all ECMs currently in use. A system whereby the power of the ECM is increased without increasing cost and a system in which information is continuously downloaded and changes made to the engine without stopping the vehicle would be highly desirable. Such a system is even more desirable in situations where fleet vehicles are involved.

SUMMARY OF THE INVENTION

These problems are addressed by the present invention, a distributed engine processing system.

The present invention provides a distributed engine processing system, which includes a plurality of engines with an electronic engine control module located within each of the engines. The electronic engine control module is in substantially continuous communication with a server, which is located remotely from the electronic engine control module. There is included in the invention a means of communication between the electronic engine control module and the server.

The present invention further provides a method for distributing engine processing. The electronic engine control module downloads engine information to the server, which stores the engine data. The server then performs processing and analysis of the downloaded information from each engine and processing and analysis of the information downloaded by all engines.

The invention also provides a method for adaptation of the engine in response to the analyses by the server and a method for notification of the customer or owner of the engine of the changes made to the engine or any necessary services that should be performed on the engine. Both methods include storage of the information about actions and/or notifications in the ROM.

It is an object of the present invention to expand the non-real time processing and storage capabilities of the electronic engine control module by removing non-real time functions to an off-board server. Through the removal of the non-real time functions, the limited resources of the ECM may be directed to those processing needs, such as controlling engine functions, which are necessary to keep the engine operating. Consequently, the ECM can prove to be more efficient in those operations for which it maintains responsibility.

It is an additional object of this invention to allow virtually unrestricted computing power and memory to be available to the ECM via the computer network. This increase in computing power and memory does not have the undesired increase in cost that the addition of computing power or memory directly to the ECM has, thereby creating more powerful ECMs without the higher per unit cost. Therefore, the problem of the delicate balance between power and cost is eliminated since the customer has the best of both, an ECM having greater power via the network without the additional cost.

It is a further object of the present invention to facilitate the collection of data about an entire engine population. By using the ECM to communicate directly with the server, all data acquired by the ECM is periodically forwarded to the server. This transmission does not require the labor intensive, manual downloading to handheld units and personal computers that current ECMs require. In addition to the lack of manually downloading all of the data, all ECMs are communicating with one central server, thus all data is gathered in a single location. Therefore, the need to have the data transmitted easily and to one location is satisfied.

Another object of the invention is to permit real-time adjustments to the engine without requiring the vehicle operator to stop to make those adjustments. Since the off-board server is in virtually continuous communication with the ECM, the server performs the processing as stated above and is able to make a determination if the engine operating parameters require some adjustment and what type of adjustments are needed. Any instructions for the needed adjustments would be issued from the server to the ECMs, which make the necessary adjustments via electronic means. In addition, the server is in communication with other data sources such as weather sources, global positioning surveys, and the like. When the server detects a change in these conditions, an analysis of the statistical models, also stored in the server, in the changed conditions may be done. The server would then have a set of results and corrective actions to send to the ECM for necessary adjustments. The benefit is the capability to perform adjustments "on the fly" through the remote means afforded by the server versus the current method of stopping and manually making the changes.

DESCRIPTION OF THE FIGURES

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
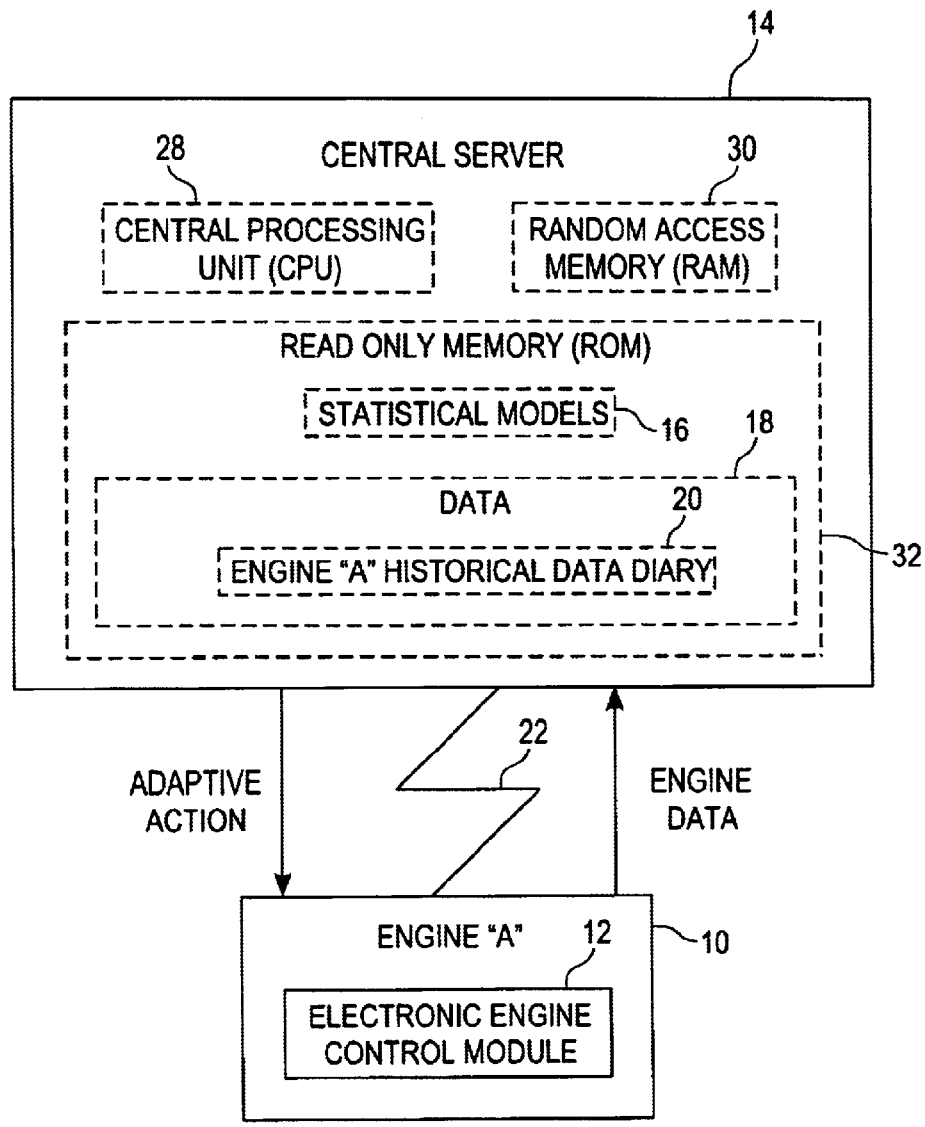
FIG. 1 is a block diagram of a basic embodiment of the distributed engine processing system utilizing an example Engine "A" to show the relationship.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

FIG. 1 is a simplified view of the present invention showing one engine in relation to the central server; however, it should be understood that a plurality of engines can be in communication with the central server at any one time. All engines could be related to the server in a substantially similar manner as Engine "A" in FIG. 1.

Referring to FIG. 1, an engine 10 is controlled by an electronic engine control module (ECM) 12. ECM 12 controls many of the functions of engine 10 through various electronic control signals and is of an ordinary type known in the art with few, if any, structural modifications. Located remotely from ECM 12 is central server 14, which is in substantially continuous communication with ECM 12.

Server 14 can be a conventional server and contains central processing unit (CPU) 28, random access memory (RAM) 30, and read only memory (ROM) 32. It should be understood that other forms of memories might be utilized, such as "flash" memory, EEPROMs, EPROMs and others. However, in the following description, the acronyms ROM and RAM will be used to describe the memory. CPU 28 must have sufficient computing power to perform simulations using engine data acquired from all engines linked to the distributed processing system of the present invention. As is known in the art, the size of CPU 28 will vary based upon the complexity and number of simulations to be performed.

RAM 30 is used mainly for quickly accessing data and calculations in a manner similar to that of RAM usage in any conventional personal computer. RAM 30 may also be varied in size or type depending upon the need for faster calculations. ROM 32 must be sufficiently large to store data from all engines over an extended period of time. The actual size of ROM 32 will vary depending upon the amount of data to be stored which may be dependent upon such factors as the number of engines for which data is to be stored, type of data, and the period of time for which the data is to be kept. The server 14 may also include a long-term data storage medium.

Also depicted in FIG. 1 are the contents of ROM 32. Stored within ROM 32 of central server 14 are statistical models 16 of all engines included as part of a fleet of vehicles. Also stored in ROM 32 is data 18 from all engines, which can include a reference library of all problems, occurrences, and transactions within the fleet. This information may be accessed and examined at any time. Data 18 from each individual ECM 12 creates a historical data diary 20 for a particular engine and may also be accessed and examined at any time.

As seen in FIG. 1, server 14 and ECM 12 are in substantially continuous communication via support network 22. Support network 22 may either be a wireless communications network, such as a cellular network, or may be provided through attached systems. The content of the communications along network 22 may be engine data 18 as provided by ECM 12 to server 14, or the necessary adaptive action instructions provided by server 14 to ECM 12. These communications may be continuous, periodic, or scheduled.

Figure 2:
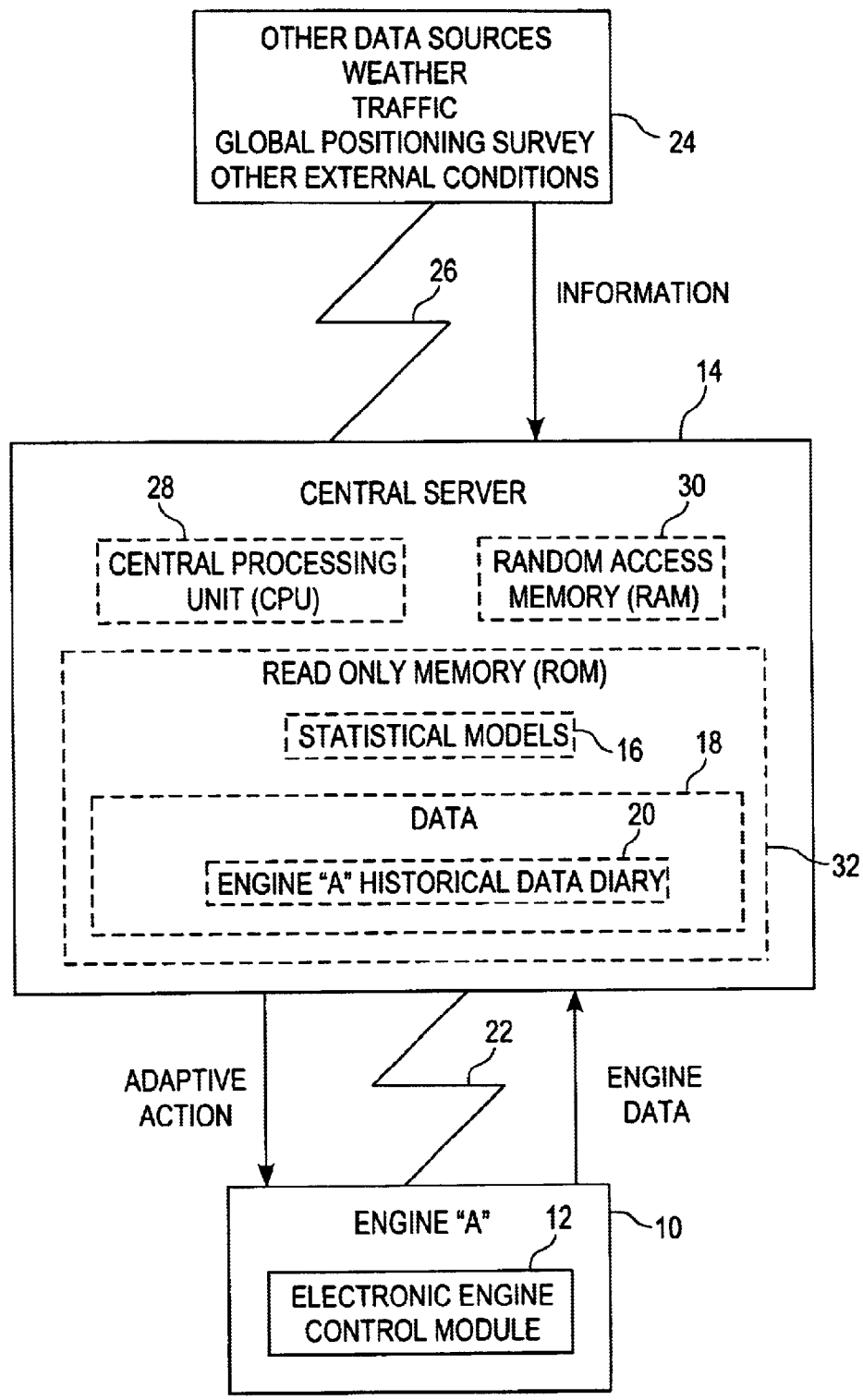
FIG. 2 is a block diagram showing a second embodiment of the invention.

Referring now to FIG. 2, there is shown a second embodiment of the present invention. This second embodiment includes all elements of the basic embodiment with the addition of data sources 24. Data sources 24 are in communication with server 14 and may provide information regarding upcoming weather conditions, traffic problems, terrain information or other information, which creates a need for adjustments to engine 10. Network 26 between data sources 24 and server 14 is similar to support network 22 and may be a wireless network, such as cellular, or be provided through attached systems. Data sources 24 provide information, which may not be essential to the operation of engine 10 itself; however, data sources 24 provide information about the driving environment that could potentially affect the overall operation of engine 10.

Figure 3:
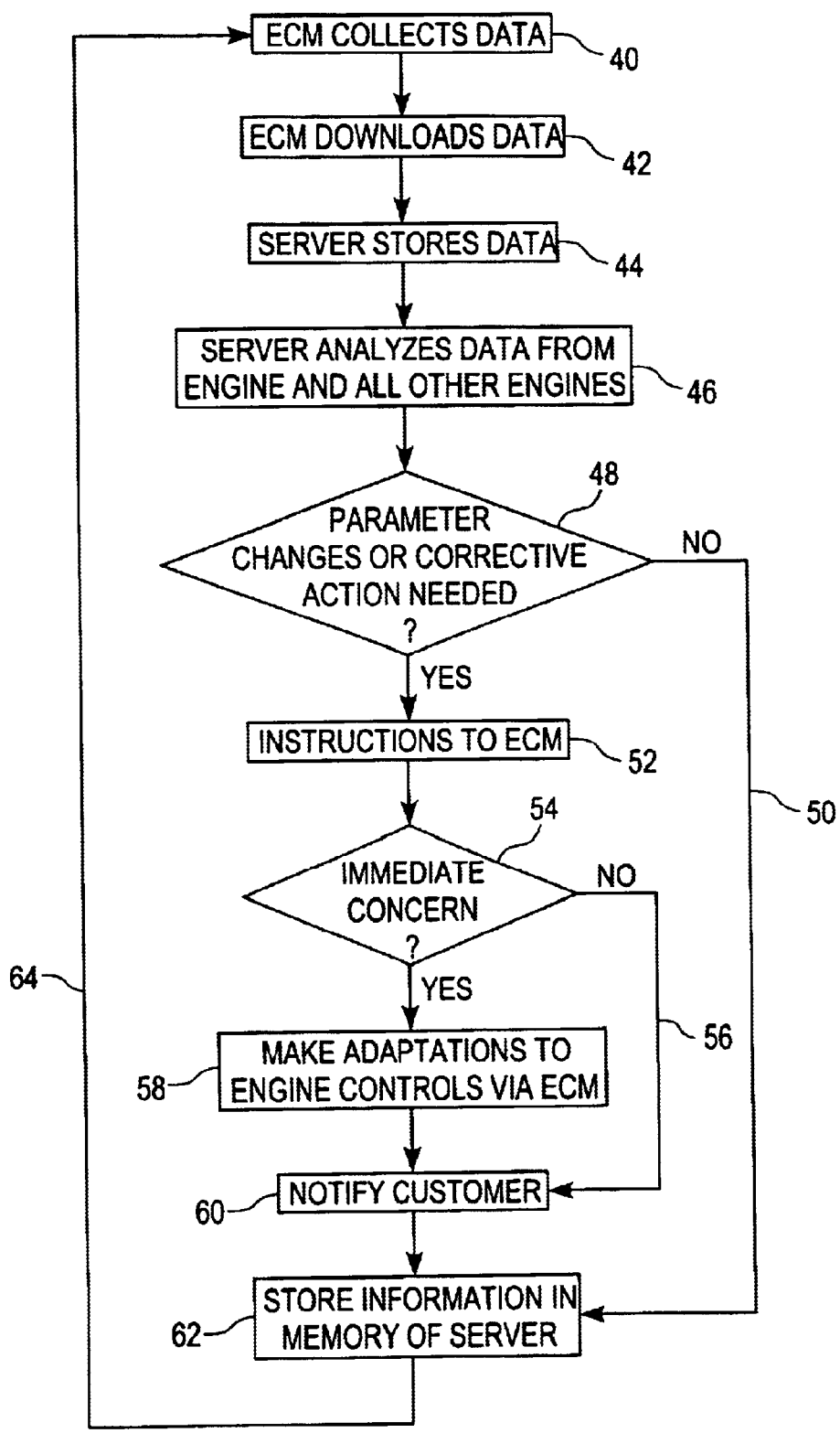
FIG. 3 is a flow chart showing the basic operation of one embodiment of the distributed engine processing system.

FIG. 3 depicts an operational flowchart for one embodiment of the present invention. When the distributed engine processing system of the present invention is in operation, ECM 12 continuously collects engine data 18 in step 40, as is known in the art. However, instead of ECM 12 performing non-real time and real time processing of all data from engine 10, data 18 can be downloaded in step 42 to central server 14 where the non-real time processing and real time processing beyond the urgent operations of the engine is performed. ECM 12 would preferably still perform those operations which are necessary to the continued operation of engine 10, such as controlling the firing of the spark plugs and pistons, controlling the injection of fuel by fuel injectors, etc. This split in processing enables ECM 12 to become more efficient by eliminating operations that are extraneous and would be better performed by devices with greater computing power, such as server 14.

Once server 14 receives engine data 18, data 18 is stored in ROM 32 at step 44 for possible later reference. After storage of data 18, at step 46 the server 14 analyzes engine data 18 downloaded from engine 10 and downloaded from all other engines. This analysis requires that a comparison be made between engine data 18 and statistical models 16, which are also stored within ROM 32. Additional analysis of engine data 18, such as engine efficiency, rich/lean mixture, and engine torque, may also be performed at this time.

Once the analysis, or analyses, occurs, server 14 arrives at a decision block 48 where server 14 must determine if some form of corrective action is needed. When no action is indicated, control follows bypass 50 to step 62.

In the event that corrective action is needed, server 14 sends instructions to ECM 12 at step 52, instructing ECM 12 as to what corrective actions to perform. ECM 12 would then make the necessary adjustments to engine 10 via electronic means in step 58, as is done by any ECM known in the art. After the corrective action is taken, the customer is notified via ECM 12. If the corrective action is not an immediate concern, as determined at condition 54, then server 14 would bypass taking corrective action and would only direct through bypass 56 the notification of the customer by ECM 12 at step 60. Once the actions and/or notifications occur, the information regarding the corrective action and/or the notification from ECM 12 is stored in ROM 32. Even in the event that neither corrective action nor notification of the customer is needed, information regarding the lack of action or notification is stored in ROM 32 in the same manner. Once the information is stored in step 62, a complete record of engine data, corrective actions, and notifications is retained in ROM 32. This information then comprises the reference library or the historical diary mentioned above.

The cycle depicted in FIG. 3 is a repetitive cycle along loop 64 and is performed to provide optimum engine performance. By allowing this to be a repetitive cycle, the engine may be constantly adjusted remotely versus being adjusted only when stopped at irregular intervals. Also, the constant repetition of the cycle creates an ability to determine if the engine might be experiencing a degradation in performance. Since the analysis and storage of data is constant, there will be an accurate record of engine performance and adjustments for an extended period of time; this record can then be examined for any such degradation.

While the description thus far has discussed operations of the system while the engine is running, it should be understood that the engine does not need to be running for the distributed engine processing system to operate. As long as it is possible for the ECM to transmit and receive the data to and from the central server, then the system is operational. Only in the event of a failure of the ECM to collect and transmit, a failure of the network, or a failure of the central server will the system not be functioning.

The present embodiments have focused upon the ability to make corrections to the engine for performance optimization. However, additional embodiments of the invention may include algorithms for performance tracking; diagnostics, prognostics, and maintenance; and marketing potential. An embodiment utilizing the distributed engine processing system for performance tracking requires the creation of algorithms which would create detailed engine models that track the actual degradation and performance of the engine. An embodiment for performing diagnostics, prognostics, and maintenance requires algorithms to be added that identifies failures of the engine and to determine any corrective action that should be taken. Lastly, an embodiment of the present invention could assist in the marketing arena by being used to identify upgrades and predict benefits for the customer as well as identify possible beneficial configurations and predict costs for potential customers.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A distributed engine processing system, comprising:
   a plurality of engines;
   a plurality of electronic engine control modules each configured to control, and to collect engine data relating to, operation of a corresponding one of said engines;
   a server located remotely from each of said plurality of electronic engine control modules; and
   a communications network established between each said plurality of electronic engine control modules and said server;
   wherein each of said plurality of electronic engine control modules is configured to provide said engine data collected thereby to said server via said communications network, said server analyzing said engine data for all of said plurality of engines and determining adjustment instructions based thereon, said server transmitting said adjustment instructions to each of said plurality of electronic engine control modules via said communications network, and each of said plurality of electronic engine control modules electronically adjusting operation of a corresponding one of said plurality of engines based on said adjustment instructions.

2. The system of claim 1 wherein said communications network is configured for substantially continuous communications between said plurality of engine control modules and said server.

3. The system of claim 1 wherein said server includes a central processing unit configured to analyze said engine data for all of said plurality of engines and determine said adjustment instructions based thereon.

4. The system of claim 3 where said server further includes a memory unit coupled to said central processing unit, said memory unit having stored therein statistical models of said plurality of engines.

5. The system of claim 4 wherein said central processing unit is configured to analyze said engine data for all of said plurality of engines by comparing said engine data for all of said plurality of engines and said statistical models stored in said memory unit, said central processing unit determining said adjustment instructions based on said comparison.

6. The system of claim 5 wherein said adjustment instructions include notification information indicative of electronic adjustments made to the operation of said plurality of engines resulting from said adjustment instructions.

7. The system of claim 6 wherein each of said plurality of said electronic engine control modules is responsive to said notification information to notify an operator of a corresponding one of said engines of said electronic adjustments.

8. A method of electronically adjusting operation of a plurality of internal combustion engines via a server located remotely from the plurality of engines, the method comprising the steps of:

receiving via a communications network engine data collected from each of the plurality of engines by associated ones of a corresponding plurality of electronic engine control modules;

analyzing the engine data collected by each of the plurality of electronic engine control modules;

determining, based on the analyzing step, adjustment instructions for electronically adjusting operation of each of the plurality of engines via corresponding ones of the plurality of electronic engine control modules; and transmitting via the communications network the adjustment instructions to each of the plurality of electronic engine control modules.

9. The method of claim 8 wherein the server includes a memory unit having stored therein statistical models of the plurality of engines;

and wherein the analyzing step includes comparing the engine data for all of the plurality of engines and the statistical models stored in the memory unit;

and wherein the determining step includes determining the adjustment instructions based on the comparing step.

10. The method of claim 8 wherein the adjustment instructions include notification information indicative of electronic adjustments made to the operation of the plurality of engines resulting from the adjustment instructions.

11. A method of electronically adjusting operation of a plurality of internal combustion engines via ones of a corresponding plurality of electronic engine control modules, the method comprising the steps of:

collecting engine data from the each of the plurality of engines;

transmitting via a communications network the engine data collected from each of the plurality of engines to a server located remotely from the plurality of engines, the server analyzing the engine and determining adjustment instructions based thereon;

receiving via the communications network the adjustment instructions determined by the server; and electronically adjusting operation of each of the plurality of engines based on the adjustment instructions.

12. The method of claim 11 wherein the adjustment instructions include notification information indicative of electronic adjustments made to the operation of the plurality of engines resulting from the adjustment instructions.

13. The method of claim 12 further including the step of notifying operators of the plurality of engines of the electronic adjustments.

* * * * *